Nov. 8, 1949  G. M. SHEPHERD  2,487,077
COLORIMETRIC GAS DETECTION
Filed Dec. 28, 1943

INVENTOR
George Martin Shepherd
BY
ATTORNEY

UNITED STATES PATENT OFFICE 2,487,077

COLORIMETRIC GAS DETECTION

George Martin Shepherd, Brookfield, Mo., assignor to the United States of America as represented by the Secretary of Commerce Application December 28, 1943, Serial No. 515,996

8 Claims. (Cl. 23—232)

(Granted under the act of March 3, 1883, as amended April 30, 1928; 370 O. G. 757)

The invention herein described may be made and used by or for the Government of the United States without payment to me of any royalty therefor.

This invention relates to colorimetric gas detection and aims generally to improve the same. It is particularly, but not exclusively, useful for the detection of extremely small concentrations of carbon monoxide in air as in the cabins of aircraft, and in modified forms for the quantitative determination of the concentration thereof and for similar uses in connection with hydrocarbon fumes, other reducing gases, and even oxidizing gases.

Even at normal atmospheric pressure, a concentration of carbon monoxide as little as .4 of one percent is fatal to man in less than an hour, .15 of one percent is dangerous in an hour, and as little as .05% will cause headache and may be dangerous in a single hour. At high altitudes, human tolerance is greatly less than it is on the ground.

The presence of carbon monoxide in aircraft, particularly warplanes, is an ever present problem. In the case of fighter planes, damaged manifolds, for example, are a frequent source of carbon monoxide entering the plane; in bombers there are many sources; in some types of plane there is always some carbon monoxide present, and it is very essential to know, particularly in combat work and long-distance bombing flights, whether its concentration has reached dangerous proportions. Hence a simple and reliable method and means of detecting and determining carbon monoxide in aircraft is not a mere stand-by provision, like a fire extinguisher, but a day-to-day necessity, with detection preferably on a continuous basis, and the same considerations apply in numerous other military and industrial locations.

Now carbon monoxide is a reducing gas, and as early as 1915 it was known that ammonium molybdate in the presence of colloidal palladium was reduced by hydrogen to molybdenum tetrahydroxide, and this reaction was used to absorb hydrogen analytically (Paal and Büttner with Brunjes, Berichte 48, 220, 1915). It was further known that carbon monoxide would reduce palladium chloride.

More recently it has been proposed to absorb palladium chloride and ammonium molybdate solutions on purified silica gel and to use the thus sensitized gel to approximately measure concentrations of carbon monoxide in air by flowing the air, adjusted to 30% relative humidity, through the gel at such a slow rate of speed that substantially complete CO absorption would occur, the estimate being based on the longitudinal extent of color development in a given time. The gel was initially a yellow color and turned bluish on exposure, but the colors were somewhat muddy, and hence the estimate was based on physical length of color change, and not on any attempt at colorimetric discrimination. For this and other reasons the indicator thus prepared was impractical for use in the field or on board aircraft. It was sensitive only at a certain fixed humidity and lost its sensitivity when wet or dry air (departing materially from 30 percent relative humidity) was passed over it. Thus, in use, the humidity of the air sample had to be adjusted and held constant at about 30 percent relative humidity, mitigating particularly against use of the device for continuous sampling to warn of the presence of carbon monoxide. Moreover, this chloride gel was not sensitive below zero degrees centigrade (freezing point of water); was not as sensitive as needed for high altitude work; its color development was slow and of a muddy tone not adapted to colorimetric evaluation; and its color began to fade immediately on termination of sampling, rendering the accuracy of observations incapable of later check. As its color development was muddy and not clear and also of color-wedge form it was necessary to rely on very slow percolation of the air sample, and to guess at the progressive distance of color change. Further research indicates these and other difficulties are inherent in any palladium chloride sensitized gel and that all gels so made become insensitive to carbon monoxide when dried to less than 6% water by weight (loss at 280 degrees C.) as by exposure to flow of air of less than 30% relative humidity for any substantial length of time.

The present invention aims to overcome respective ones of these difficulties, and hence contemplates among its objects, severally as well as in various combinations, the following respective objects; (1) to avoid the humidity limitations inherent in the known palladium chloride catalyst source, (2) to provide a new and stable palladium catalyst solution, (3) to provide an indicator having improved sensitivity, (4) to provide an indicator sensitive at practically complete dryness, which does not lose its sensitivity in flow of extremely dry air, (5) to provide an indicator sensitive at temperatures considerably below zero degrees C. (the preferred embodiment is adequately sensitive even at minus 40 degrees C.), (6) to provide an allochroic indicator which develops its color clearly and promptly on a scale favoring occular discrimination and comparison to a high degree, (7) to provide an indicator which, having developed a given color indicative of the concentration of the gas, retains that color substantially unchanged, facilitating check and comparison, (8) to provide an indicator retaining its sensitivity over extremely long periods, (9) to provide an improved indicator tube or ampoule, (10) to provide improved dryness indicating arrangements adapting the device for continuous sampling or to attain other advantages, (11) to provide improved structural features contributing to the general improvement of the ampoule, (12) to provide color comparator elements if desired, (13) to provide improved and simplified modes of sampling with the new allochroic indicator, (14) to provide optimum color smoothness, clarity and standardization, rendering the device capable of accurately and quickly measuring carbon monoxide concentrations of the order of only a few parts per million, and the like, (15) to provide a sensitive indicator adaptable for determination of ether, ethylene, vapors or gases of unsaturated hydrocarbons and other organic vapors and gases, natural gases, and even the degree of saturation of blood by carbon monoxide by analysis of alveolar air, (16) to provide a sensitive indicator adaptable for determining oxidizing gases and vapors, and (17) to provide an indicator adaptable for controlling of automatic apparatus.

The invention also contemplates specific and detailed improvements in procedure, methods, reagents and assemblage contributing to any of the foregoing objects and to other objects and advantages as will be apparent from the following detailed description of preferred embodiments illustrated in the accompanying drawings, in which.

I. GENERAL CONSIDERATIONS AND DESCRIPTION

As above mentioned, aboard aircraft or in the field it is impractical to condition the air as to humidity, but perfectly practical to thoroughly dry it. Passage of the air through highly activated silica gel dries it so thoroughly that it contains only about .00001 gram of water per liter, corresponding to a vapor pressure of about .01 mm. of mercury. But prior to the present invention, there was no allochroic indicating gel, and more particularly, no colorimetric indicating gel, that would not lose its sensitivity in the presence of such well dried air.

As it was known that carbon monoxide would reduce palladium chloride, it was natural to start with this salt of palladium in attempting to prepare a satisfactory indicating gel. But every indicating gel so made became insensitive when dried.

The present research was therefore undertaken, departing from the indicated path, and has led to the discovery that by entirely eliminating chlorides, and using as the source of palladium a special sulphuric acid solution of the metal itself, it is possible to obtain the palladium in a new form which in combination with the ammonium molybdate on silica gel detects and will indicate colorimetrically extremely small quantities of carbon monoxide and the like when the indicator, its auxiliaries, and the air sample, are all thoroughly dry.

The present invention thus is based on a new combination in which the form of the palladium differs chemically and physically from that in the previously prepared indicating gel, and the discovery that this new form possesses, as could not be predicted, the desired property of catalyzing the reduction of molybdenum when very dry. The new allochroic indicating gel made with this different form of palladium retains its full sensitivity over long periods of percolation by well dried air, or when it is stored next to a thoroughly dried white silica gel in the glass indicator tube. Thus, in contrast to the prior indicator, which would have required, for continuous flow sampling, elaborate apparatus for fixing the relative humidity of the flow sample at about 30%, the new allochroic indicator can be used for continuous sampling without any auxiliary apparatus other than the flow producer, and, when necessary, a simple drying tube, as will hereinafter be more fully described.

In addition to the above advantage, however, the new indicator has other advantages. For example, it has greatly superior sensitivity. At 20° C. it is 4 times as sensitive as the best chloride sensitized gel that could be produced after long research and experiment in that field. This alone means a four-fold reduction in the time required for a single determination of carbon monoxide. It is also sensitive at temperatures below 0° C., and its sensitivity even at −40° C. enables the obtaining of satisfactory indications.

Also, the new indicator has a greatly superior color range. Its color develops, on reaction with carbon monoxide, from clear canary yellow through a bright emerald green to a clear blue-green, ending with a clear dark blue. The new indicator thus interposes between a silica-molybdenum yellow and a molybdenum blue, a clear molybdenum green, and the yellow-green-blue range, in clear bright colors, covers a range to which the discriminative ability of the eye is well adapted. The change of color from yellow to the first light green is particularly easy to observe when an unexposed yellow gel is held alongside the yellow gel which is being exposed. Since the gel made with the molybdenum and sulphuric acid, but without the palladium, is yellow but does not change to green upon exposure to small amounts of carbon monoxide, such an inactive gel, when properly matched and dried, can be placed at one or both ends of the active gel in the indicator tube and thus serve as a zero color guide. When the active gel reacts with carbon monoxide, it blossoms out distinctly from the inactive gel between which it may be sandwiched.

As contrasted with the prior indicator, the new indicator develops a color not only ideally suited to colorimetric determination but one which is permanent in the absence of special treatment. With the prior indicator in which the color developed was unsuited to colorimetric determination and began fading immediately, the practice was to roughly determine carbon monoxide by measuring the longitudinal extent of the color change developed in the tube. This practice necessitated a relatively large diameter tube to reduce linear gas velocity, such that a pound of gel would charge only about 500 tubes, and permitted only rough estimations in the range 0 to 0.02 percent by volume, i.e. 0.005% and 0.02%. The new indicator enables colorimetric determination with rapid gas flow. This enables smaller diameters to be used, so that a pound of gel may charge, in one embodiment 2700 tubes, and in another 7000 tubes, and permits field determinations in at least six clean steps in the range of 0 to 0.02%, i.e. 0.0025, 0.005, 0.0075, 0.01, 0.015, and 0.02%, as well as in other ranges. In addition the carbon monoxide can be determined, with reproducibility to 2 parts per million (in the range 0 to 100 parts per million) by volume in the laboratory with the new colorimetric indicator.

The color developed by the new indicator, moreover, depends directly upon the mass of carbon monoxide reacting. The reacting mass is essentially directly proportional to the concentration, density, and time of flow of the sample above certain critical rates of flow and between wide variations in flow. By the present invention, the rate of flow is made such that the concentration of the gas remains substantially unchanged in its passage through the indicator, and the density at such rate of flow is directly proportional to the atmospheric pressure of the source being sampled, so by this provision the colorimetric indication of concentration is rendered essentially additive over a wide range of composition permitting true colorimetric discrimination. This greatly simplifies the analytical application of the gel. The sensitivity of the gel must have a practical limit, but experiment has shown this must be well below one part of carbon monoxide in one-hundred million.

The new rapid flow procedure provided by the invention obviates, and indeed may be said to make useful, a factor mitigating against accuracy in the determination of the prior longitudinal color development. The eye has a great capacity to average small variations in shading and sees only the average color. This made it difficult to determine to just what point, in a space of two millimeters, color development had occurred in the prior device. In the colorimetric determination of the present invention, however, it facilitates matching of the average color of a section of indicator body say, 5 to 10 millimeters long, against a standard color chart, and obviates doubts which might be engendered, when rate of flow is to be kept as low as feasible, by appreciation of a color-wedge effect in the body of the indicator.

A final general consideration of importance in connection with the new indicator is the relation of its chemical reaction to the human physiological reaction to carbon monoxide. At a fixed sampling rate, the reaction of the gel is directly proportional to the product of time and concentration, as is the human physiological reaction, but it responds more quickly, and in the ranges of toxicity, this relation is most useful. Because of it the new indicator is ideally suited to warn the human. Also, the new indicator may be employed for automatic shut-off of the ventilating system of a plane when, on exposure to the circulating air, it develops a warning color and thereby actuates a photoelectric cell.

For quantitative determinations, the present invention contemplates any suitable mode of standardizing the exposure of the allochroic indicator to the atmosphere to be tested to render its indication colorimetric. Preferably a definite volume of sample will be passed through the indicator at a fixed rate of flow (which may be of the order of 1 to 2 ml. per second in the case of an indicator having a length of 12 mm. and a cross-section of 5 mm.). Such rate of flow may be obtained in a simple manner by connecting to the outlet end of the tube a simple aspirator bulb (which may be of the 60 ml. size) having its inlet suitably constricted, as by a needle valve, to allow only the desired rate of flow. Alternatively any small pump, driven by a spring motor or otherwise, and any suitable timer, may be employed; in the laboratory these may be a calibrated flow meter and stop watch. When employing the aspirator bulb, compensation for changes in mass of the air with altitude may be effected by a conversion table, or by increasing the number of times the bulb is squeezed, from 1 or 2 at the surface to 5 or 10 at extremely high altitudes to maintain the same color-concentration ratio, and similar compensation may be made in other arrangements. In both bomber and fighter types of aircraft, and elsewhere where an air-suction line is available, such line may be employed with any suitable restricting orifice and timer; and it may likewise be employed as the air flow producer for continuous sampling, as will hereinafter more fully appear.

In the forms shown in the drawings (Figs. 1 to 3), the allochroic indicator 10 therein shown is housed generally centrally of the clean glass tube 11, between bodies of guard-gel 12, 13, held in place by air-pervious retaining wads 14, 15, the ends of the tube or ampoule 10 being suitably closed, as by sealing-off to form frangible tips 16 and 17. One or more bodies of water sensitized allochroic gel 18 may be included in the tube. Thus, if any imperfection should develop in a seal at 16 or 17, permitting ingress of moisture, the color change of the element 18 would warn that such tube was no longer dry and should be discarded.

In the preferred form a body of the water sensitive indicator 18 is placed in the tube 11 near its air inlet end 16 (see particularly Fig. 1), and in this position has the added utility, particularly for continuous flow sampling, of indicating promptly the exhaustion of the dryer tube through which the sample is supplied to the inlet 16. When but a single body 18 is employed, as in Fig. 1, the dryer tube and tube 10 will then be replaced by others to continue the continuous flow sampling; but the invention further contemplates extending the availability of the indicator tube for use in continuous sampling by provisions of which preferred embodiments are shown in Figs. 2 and 3.

Figures 2, 3, 5, 6:
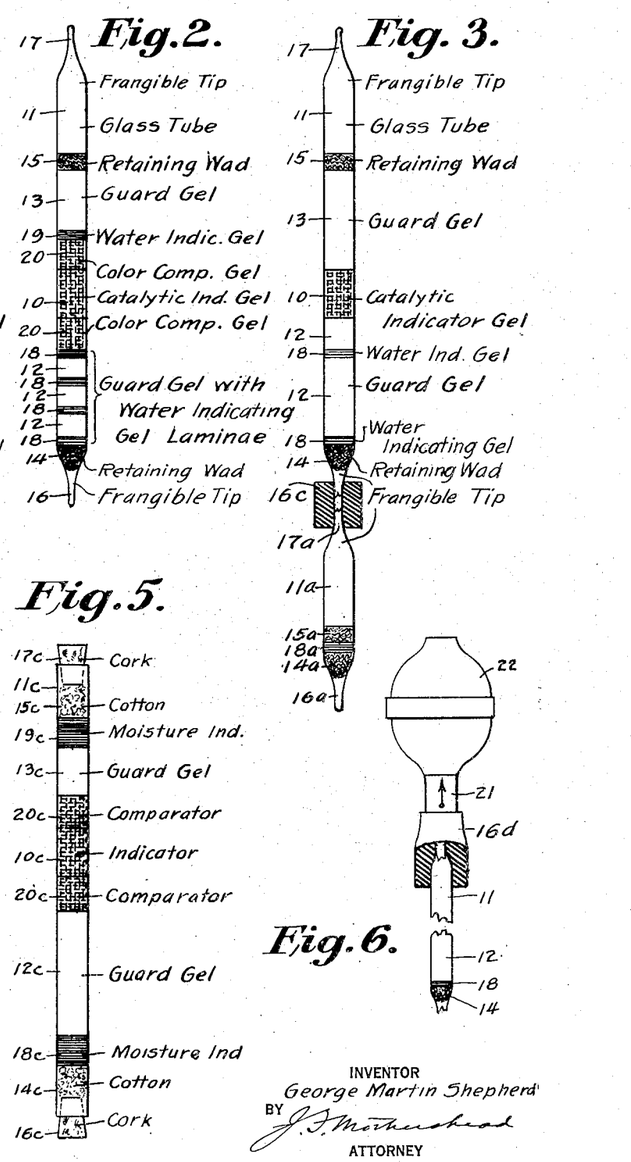
Fig. 3 is a similar ampoule with a separate moisture detector.
Fig. 6 illustrates a simple mode of using the device for gas determination.

In Fig. 2, for example, a plurality of bodies 18 of water indicating gel are interposed in spaced relation in the intake guard gel body 12. With this arrangement, even if the laminae 18 were of a character undergoing irreversible color change, on exhaustion of the dryer tube and change of color of the body 18 nearest the inlet end of the indicator, only the dryer tube would need be changed, and by taking suitable precautions to prevent confusion, as by covering up the changed body 18, or by placing an indicator adjacent the next unchanged body 18, the tube 10 could be continued in use until change in color of the second body 18 showed the second dryer tube had been exhausted. In the form shown in Fig. 2, this could be continued four times.

The present research has disclosed, however, that in the presence of the guard gel body 12 and dynamic flow of the air sample, a lamina 18 of cobaltous-chloride sensitized gel will, after its initial color change, on substitution of a new silica-gel dryer-tube, be restored to its initial color, and that this usually occurs without any change in color of the second axially spaced lamina of water indicating gel 18. Thus, in this instance the lamina or laminae nearest the inlet may be used as a guide to dryer tube change and the more remote lamina 18 may be used as a reserve and discard indicator.

When desired, a further lamina 19 of water indicating gel (Fig. 2) may be included in the guard gel 13 on the exhaust side of the allochroic indicator. Such provision will enable it to be determined whether moisture has backed up into the tube during an idle period in the otherwise continuous sampling.

Figure 4:
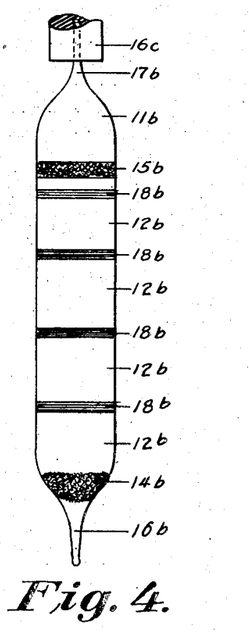
Fig. 4 is an illustrative dryer-tube embodying features of the invention.

It is further contemplated that all but one of the water indicating bodies 18 may be segregated in a separate replaceable moisture indicating unit 11a (Fig. 3), or in the dryer tube 11b (Fig. 4). Thus, in Fig. 3, the moisture indicator 18a is embraced by retaining wads 14a, 15a in a tube 11a having frangible tips 16a, 17a and adapted to be connected in series between the dryer tube and indicating tube 11 by suitable means as rubber connectors 16c. In Fig. 4, the dryer tube 11b contains the dryer or water adsorbent guard 12b, preferably of activated silica gel, interposed between retainers 14b, 15b at the inlet and outlet ends 16b, 17b, and the moisture indicator comprises at least one allochroic lamina 18b located near the outlet end 17b, and preferably comprises several such laminae distributed progressively along the length of the dryer 12b as shown. By the latter provision the extent of exhaustion of the dryer tube will be clearly indicated when the dryer 12b has such local retentivity for water as to render this provision useful, as in the case of high-density activated silica gel.

The non-allochroic color comparator gel 20, mentioned above, is shown in Fig. 2, at either side of the indicator body 10. In Figs. 3 to 5 corresponding parts are indicated by similar reference numerals with subscript letters.

A simple mode of embodying the invention is illustrated in Fig. 6, in which the tube 11 is connected at its outlet end by a rubber connector 16d to the inlet valve 21 of aspirator bulb 22. With a tube 11, of say 3 to 5 mm. inside diameter, the bulb 22 may conveniently have a capacity of about 60 ml., and the inlet valve 21 may be adjusted to allow the bulb to fill in about 30 to 40 seconds. With such arrangement a single squeeze and release of the bulb will suffice for a spot test at surface elevation, the procedure being varied as above indicated for high altitudes.

II. COLORIMETRIC INDICATOR

The indicator 10, truly colorimetric when used for quantitative determination as above outlined, and allochroic when employed in continuous flow sampling, is the central feature of this invention. Its preparation involves a number of steps, i. e.:

(a) Preparation of the silica gel
(b) Preparation of the palladium solution
(c) Preparation of the ammonium molybdate solution
(d) Proportionate combination of the two solutions
(e) Preparation of the colorimetric indicating gel.

As the present invention includes improvements in each of these steps except step (c), as well as improvements flowing from combinations thereof, as will hereinafter appear, the illustrative description herein will deal with the steps under separate sub-heads.

a. Preparation of silica gel

Commercial silica gel is available in the so-called high density gel, employed in the prior chloride sensitized indicator above mentioned, and in a lower density form. The higher density gel is usually supplied in larger granular sizes and holds onto occluded moisture and gases much more tightly than the lower density gel. The present research has disclosed that it is advantageous to employ the low-density gel as the base for the colorimetric indicator 10, and the high-density gel as the guard gel 12, 13. In this manner best protection by the guard gel is assured, and the ability to dry the indicator gel to an extremely small moisture content is facilitated.

In preparing the gel for the indicator 10, therefore, the low density gel is preferred, and while coarser grain may be employed, as 6–16 mesh for example, it is preferred to use a gel of the order of one which will pass 20 and be retained on 65 mesh, for example. The gel must be thoroughly free of organic matter, and is therefore highly purified as by nitration and washing completely free of $HNO_3$ with distilled water, i. e. to a pH of 4 to 4.6 when surrounded by distilled water at 99° C. for 24 hours. The gel is then heated to complete dryness (as by heating to 280° C. for about 16 hours under a reduced pressure of 40 mm. or less, or at 280° C. for 5 days or more at atmospheric pressure), cooled in dry air and stored protected from moisture.

*Example 1.*—A 6–16 mesh gel, if not freshly activated may be activated by heating overnight at 280° C. After cooling and washing repeatedly, as 3 times with sufficient distilled water to more than cover the gel (which also breaks down the grain size of the gel) it may be dried quite thoroughly to assist the nitration, and cooled, then boiled two hours in concentrated $HNO_3$, decanted, again boiled with fresh acid, and then washed repeatedly (10 times) with distilled water, decanting each time. Several final washings of eight hours in distilled water on the steam bath should remove all noticeable traces of the acid and leave the gel ready for drying, preferably at 280° C. under reduced pressure for 16 hours. After cooling, while open to air through a separate drying tube, the gel is stored protected from moisture. This procedure may be used for small amounts of 6–16 mesh gel, say 250 grams, and may be adapted for larger quantities and other sizes.

*Example 2.*—Working with smaller grained gels (28 to 42 mesh, or 20 to 65 mesh) boiling with nitric acid should be avoided, because of excessive "bumping" and consequent migratory tendency of the gel. After heating and washing as before, if needed, such gels may be given a single treatment with nitric acid in a steam bath at 99 to 100° C., adding acid as needed to maintain immersion, and continuing the nitration for about one week or until all traces of organic matter are removed. All acid may then be removed by washing for 3 weeks with distilled water at the same temperature, changed daily, after which the gel is heated to dryness and stored as before. This method may be used for larger amounts of 20–65 mesh gel, say 2500 grams, or for gel of any size and amount.

b. Preparation of palladium solution

The preparation of the palladium solution is an important novel feature of the invention. Contrary to what would be expected from prior knowledge, the present research has disclosed that a palladium catalyst entirely free of chloride, and apparently having a different mode of operation in the indicator, gives greatly improved sensitivity and avoids the limitations of the chloride catalyst. It has also been discovered that the mode of preparation of the new catalyst solution is important, and should be conducted to yield a highly stable solution.

According to the present invention, therefore, palladium sponge or palladium black is used as the source of palladium, and so digested with $H_2SO_4$ as to yield a highly stable solution of the metal in the acid. Preferably the solution is prepared to contain from 9.4 to 13 grams of palladium per liter, and from 300 to 370 grams of sulphuric acid per liter (approximately 6 to 7 normal with respect to the acid); the solution is then diluted before applying it to the gel so that the proper amounts of palladium and sulphuric acid will be taken up by the gel as hereinafter noted under the section "d. Proportionate combination of solution." The palladium solution, when properly prepared, is a deep reddish brown color, perfectly clear, and may be stored in closed bottles for long periods with no signs of any material decomposition. The solution may be prepared in a variety of ways, but in all of them chlorine compounds, or other substances which may behave in a similar way to form stable complexes which cannot finally be converted to sulphate compounds, are absent or eliminated.

*Example 1.*—Digest 5 grams of palladium sponge in 50 ml. of $H_2SO_4$ (sp. gr. 1.84 A. C. S. specification) in a flask with ground in reflux condenser until the temperature reaches 280° C. and continue digestion at that temperature for 6 hours. Cool, dilute cautiously with 50 ml. of distilled water, and filter through sintered glass. Assay the palladium in the solution and dilute the solution apportionately (with addition of $H_2SO_4$ if necessary) to a palladium content of 9.4 grams per liter, adjusting the $H_2SO_4$ concentration to about 370 grams per liter (approx. 7 normal).

The temperature of refluxing determines the form of the palladium sulfate solution obtained. A solution produced by digestion at 210° C., for example, decomposed and precipitated palladium black on standing even as little as a week. This deposition removed the catalyst and rendered the solution relatively useless. The length of time of processing may have some effect on the limit. The solution formed by digestion at 210° C. mentioned above, on redigestion at 280° C., was converted to the usable form.

*Example 2.*—To prepare a liter of solution containing 12 to 13 grams of palladium and 300 to 330 grams of sulfuric acid (total sulfate content calculated as $H_2SO_4$), take about 13 grams of very finely divided palladium metal and heat overnight in a furnace at about 600° C., to convert as much of the metal as possible to the oxide, PdO. Transfer this material to a 500 ml. Pyrex boiling flask that has a thermometer well and a ground glass joint. Add 175 ml. of concentrated sulfuric acid, connect to a reflux condenser and heat to boiling, about 300° C. Keep at this temperature until all of the palladium and palladium oxide appear to have been converted to the sulfate compound. At this point a dark brown shiny crystalline precipitate will be formed. While the heating is continued, add water slowly and very cautiously through the top of the condenser, never more than 1 ml. at a time, until the precipitate dissolves. If, during the addition of the water, sulfur dioxide is evolved, as evidenced by its odor (showing that all of the palladium has not reacted) stop the addition of the water and reflux at that temperature until no more sulfur dioxide is evolved. Continue the slow addition of water, stopping and refluxing if necessary, until all of the crystalline precipitate has dissolved and the boiling temperature is about 200° C. Cool the solution, filter through a porous porcelain or a glass filtering crucible of fine porosity and dilute to 500 ml. in a volumetric flask.

A 5 ml. aliquot of this solution is diluted to 250 ml. The palladium content is determined by precipitation with dimethylglyoxime and the sulfuric acid content determined by titrating the filtrate and washings from the palladium precipitation with standard alkali, using methyl red as the indicator.

From this analysis are calculated the amount of additional sulfuric acid needed and the volume to which the solution must be diluted to give a solution containing 12 to 13 grams of palladium and 300 to 330 grams of sulfuric acid per ml.

The stable solution continues to act as a catalyst when put on the gel for a long period, at least two years. If there is any chloride present, however, the indicator becomes practically useless, and is unsatisfactory the day after preparation so far as continuous sampling is concerned.

c. Preparation of molybdate solution

The molybdate solution may be conveniently prepared simply by dissolving pure ammonium molybdate, $(NH_4)_6Mo_7O_{24}.4H_2O$, in distilled water, preferably in the ratio of 50 grams to 1 liter of water. The present research indicates that the molybdate is unsuitable for steel analysis because it will not precipitate phosphorus, but is equally as satisfactory as that which does have the phosphorus precipitating ability.

d. Proportionate combination of solution

The palladium and molybdate solutions are next proportionately combined to prepare the reagent solution for application to the silica gel. The combination is preferably effected in ratios of 38 to 17 parts (by weight) of molybdate to 1 part of palladium and of 1 to 1.5 parts of acid (by weight) to 1 part of ammonium molybdate. When these ratios are materially exceeded the colors developed are not optimum and may be unsatisfactory. Excess palladium or $H_2SO_4$ produces colors that are muddy and not suitable for colorimetric discrimination. Too much molybdate produces a lusterless indicator of relatively low sensitivity, and too little palladium or molybdate produces colors too pale for optimum detection.

*Example 1.*—Combine 7 ml. of palladium solution (containing 9.4 grams palladium per liter and 368 grams of sulphuric acid per liter) with 33 ml. of distilled water and 50 ml. of a solution of ammonium molybdate (containing 50 grams of ammonium molybdate per liter). This mixture is sufficient to impregnate 100 grams of gel.

*Example 2.*—Combine 100 ml. of palladium solution (containing 13 grams of palladium per liter and 330 grams of sulphuric acid per liter) with 750 ml. of distilled water and 450 ml. of a solution of ammonium molybdate (containing 50 grams of ammonium molybdate per liter). This mixture is sufficient to impregnate 1000 grams of gel.

When condensorbed in the gel, as hereinafter described, the condensorption product of Example 1, above, contains by weight about 1500 parts gel, about 40 parts acid containing 1 part palladium, and about 40 parts molybdate; Example 2, about 770 parts gel, about 25 parts acid containing 1 part palladium, and about 17 parts molybdate. Example 2 represents the presently preferred practice, but the present research shows that suitable indicators can be made with from about 500 to 1600 parts gel, about 5 to 50 parts acid containing about 1 part palladium, and about 10 to 60 parts molybdate.

The ratio of acid to palladium is adjusted in the palladium solution, which is usually kept in concentrated form until just before admixture with the molybdate solution and sufficient water to more than cover the gel, just prior to condensorption. To facilitate quantity measurements, the diluent may be added, in part at least, to the concentrated palladium solution, and the resulting dilution added to the molybdate and any further diluent needed to cover the gel.

e. Preparation of the indicating gel

The combined solutions (d) are now immediately incorporated in the prepared silica gel (a), preferably in such proportions as indicated above. This incorporation is effected by mixing the gel and mixed solution (which will more than cover it), allowing absorption for a period, and continuing the absorption while evaporating down or condensing the solution to leave all its solids in the micropores of the gel, and may be termed condensorption. The resulting indicating gel, thoroughly dried (to a condition in which, when heated to 105° C., it will yield up, under a pressure of 20 mm. of mercury, only about 14 milligrams of water per gram of gel) is then stored protected from moisture and gases until ready for use.

*Example.*—For each 100 grams of silica gel, add 100 ml. of mixed palladium and molybdate solutions (containing 0.066 to 0.13 g. of palladium, 2.5 to 3.3 g. of $H_2SO_4$, and 2.2 to 2.5 g. of ammonium molybdate) in a clean flask or reagent bottle with trade standard grinding and let stand, stoppered, for 16 hours. Connect the flask to an aspirator by means of clean rubber tubing but in such a way that the rubber tube always leads downward away from the flask. Heat to 60° C. and aspirate the gel until surface dry, shaking the flask continuously enough to prevent coating out of the solution on the sides and bottom of the flask. (This agitating procedure, during the aspiration, is extremely desirable. It helps maintain uniform the temperature and rate of drying throughout the body of gel, as well as insuring condensorption of all the liquid-borne products with the gel.) This aspiration, conducted until water is no longer visibly leaving the gel, i. e. until the gel is quiet, reduces the water content to about 100 mg. of water per gram of gel (measured by loss of weight at 105° C., 20 mm. pressure in 16 hours), and thereafter the condensorption product is dried thoroughly, preferably by drying under high vacuum with a liquid air trap connected to the highly evacuated apparatus, until the moisture content is so reduced that at 105° C. and under 20 mm. pressure for 16 hours the gel will lose weight by only 14 mg. per gram of material, when it is to be used adjacent very dry guard gel, or by only 10 to 12 mg. per gram when it is to be used without such guard gel drying. When breaking the vacuum only pure air thoroughly dried as by passage through a drying tube, is admitted.

The yellow color of the indicator gel deepens as the drying progresses, and if the material is excessively dried approaches a buff tint. The optimum sensitivity is developed when the condensorption product contains only 10 to 12 milligrams of moisture freeable in 16 hours at 105° C. under a 20 mm. vacuum. When the material is to be sealed in an ampoule between bodies of guard gel 12 and 13 consisting of higher density silica gel thoroughly dried at 280° C., as explained hereinafter, the establishment of equilibrium of water vapor pressures brings the water content of the indicator gel, if initially at 14 mg. per gram, down to the desired 10 to 12 mg. per gram, the optimum value. The usual time of drying, for 100 grams of indicating gel, is about 24 hours, depending upon the apparatus used, gel temperature, and other factors. The progress of drying may be followed by empirical tests for sensitivity.

For the empirical test of sensitivity, a standard color tube which may have a 5 mm. inside diameter may be prepared in accordance with the present specification, using highly sensitive gel exposed to 108 ml. of air containing .0025% CO by volume, passed through the tube in 72 seconds, i. e. at the rate of 90 ml. per minute, and similar tubes may be so exposed with concentrations of .0015, .0020, .0030, .0035 percent of CO in air. A similar tube made of the gel to be tested, similarly exposed to .0025% CO in air, may be rated by the color developed with the identical exposure, or by the number of ml. passed to obtain a matching color, and in the latter case will be found satisfactory for aircraft work when attaining the color on passage of from 85 to 130 ml. at 90 ml. per minute.

The present research has disclosed that the optimum sensitivity may be attained, despite variations in drying, by blending underdried material with overdried material in the proportions which will average the desired 14 or 12 mg. per gram, and that in a short time the so blended condensorption product will reach an equilibrium at the desired value.

During the entire process of preparation it should be borne in mind that the slightest trace of organic matter will ruin the indicating gel. Therefore all glass should be carefully cleaned with fresh chromic-sulfuric wash, or fuming sulfuric acid. Similarly great care must be taken to avoid presence of any hydrochloric acid. The tiny traces of hydrochloric acid retained by a gel which has been treated with it, for example, even after extremely extensive washing and drying, are sufficient to destroy the sensitiveness of the colorimetric indicator.

The indicating gel as above prepared may be stored for several months in reagent bottles with trade standard ground-in stoppers, in turn stored in large desiccators with purified water indicating gel as the desiccant and no lubricant on the ground flange. Alternatively, the indicating gel may be sealed up in carefully cleaned glass tubes with long drawn out necks, care being taken to avoid any contamination of the contents by the products of combustion.

The dry indicating gel may be transferred by means of dispensing cocks with trade standard grindings made to fit the corresponding grindings in the storage containers. The work should be conducted in an atmosphere free from organic vapors, gas fumes, tobacco smoke, excessive humidity, etc.

III. Preparation of Guarding Gel

The guard gel 12, 13 is purified by nitration and washing and activated by drying at 280° C. under vacuum or at atmospheric pressure and the procedure may be exactly similar to that employed in making up the indicating gel. The present research, however, has disclosed the desirability of employing, in this connection, the higher density silica gel above mentioned, which will hold more tenaciously any water, gasoline fumes, and the like, picked up by it. Furthermore, it is preferred to employ a guard gel somewhat coarser than that used for the indicator, to offer reduced resistance to flow of gas through the tube 11, and the higher density gel likewise is more easily obtained in the larger grain sizes.

IV. Preparation of Water Indicating Gel

The water indicating gel 18, 18a, 18b, 19, like the guard gel is preferably formed of the higher density silica gel, for the same reasons, although again, the lower density gel may be used, if desired. A saturated solution of pure cobaltous chloride, diluted to 2 percent of saturation with distilled water is preferred, and this dilute solution is condensorbed on the purified and freshly activated (280° C. under vacuum for 16 hours) silica gel as by soaking for 16 hours, aspiration to dryness, and reactivation at 180° C. under vacuum, the steps being performed in any suitable manner, preferably in a manner analogous to that set forth under II (e) above, about 1.3 cc. of 2% solution being employed per g. of gel.

V. Preparation of Non-Indicating Color Comparator Gel

When it is desired to employ a color comparator gel adjacent the indicating gel, to facilitate detection of color change of the latter as on continuous flow detection, a non-allochroic gel very closely matching the initial coloration of the indicating gel may be prepared by condensorbing on 100 grams of the purified and activated low density silica gel (to obtain color smoothness comparable with that of the indicator) 75 ml. of the molybdate solution, about 1.1 ml. of sulfuric acid and 25 ml. of distilled water, all thoroughly mixed. After the 16-hour soak, the condensorption may be completed by aspirating to dryness at 60° C. and then heating to 104° C. under high vacuum for three hours. If the sulfuric acid has been properly balanced the non-allochroic indicator will, at the same shade of yellow, have almost identically the same water vapor pressure as the allochroic indicator and will come to substantially the same equilibrium with the guard gel when used therewith. If the collor fades to white, the drying time should be reduced, and blending may be resorted to to establish the proper dryness by equilibrium, as described under II (e) above.

VI. Preparation of Indicator Tubes

The present indicator may be embodied in different styles and sizes of tubes or ampoules, for different uses. One particularly desirable feature of the invention resides in the fact that it contemplates response of the indicator to the product of (1) concentration of the gas being detected, by (2) length of time of exposure, and that hence large diameter tubes (required by the chloride sensitized detector to reduce speed of gas flow and allow local absorption of the CO so the color development would progress only a distance along the tube which could be measured as an estimate of CO content) are not here required.

Also because of the new mode of procedure provided by this invention, in which the air sample is drawn through the tube so rapidly that it does not change materially in composition in passing through a 10 to 14 mm. length of the indicating gel, the speed of gas flow in the tube is rendered non-critical, and hence broad tolerances are permissible in internal diameter of the tube, resistance to flow offered by the tube filling, length of the body of indicator 10 and other factors. This greatly contributes to accuracy of the device, and to cheapness and ease of manufacture. And the further advantage flows from this method that since the concentration of the sample is substantially unaltered after a certain critical rate of flow is exceeded, it is thereafter reasonably independent of variations in rate of flow. Hence, while a 7 mm. diameter (5 mm. inside diameter) tube will be considered in the following examples for the purposes of this description, coupled with definite lengths of indicating and guard gel fillings, it will be understood that this is only illustrative and not restrictive of the invention. Indeed, due to the factors above mentioned, a tube having but a 3 mm. internal diameter is entirely practicable, and the size of the tube may largely be chosen to suit the circumstances of use, as, for example, whether it will be viewed through a magnifying lens, serve as a photoelectric control element, be viewed from a distance by the naked eye, or what.

*Example 1:*—Tubes for immediate use may conveniently be prepared of "Pyrex" 7 mm. tubing (4.4 to 5.4 mm. inside diam.) cleaned thoroughly, washed, thoroughly dried in an oven, as in the case of all other glassware used, and stored in a desiccator (without lubricant on the flange) until filled. The tube may be filled as indicated in Fig. 5, reading from inlet (bottom) to outlet (top):

(1) First 13 mm.—000 cork (xxxx quality) and a lightly packed wad of clean (medical) absorbent cotton
(2) Next 7 mm.—the blue water indicating silica gel (dry)
(3) Next 30 mm.—the white guard gel (dry)
(4) Next 8 mm.—the yellow non-allochroic gel (dry)
(5) Next 12 mm.—the yellow allochroic indicator
(6) Next 8 mm.—the yellow non-allochroic gel (dry)
(7) Next 12 mm.—the white guard gel (dry)
(8) Next 7 mm.—the blue water indicating gel (dry)
(9) Next 13 mm.—plug of absorbent cotton and 000 cork
Total length—11 cm.

The use of the organics, cotton and cork, is permissible in this instance, as their vapor pressures are low and their isolation by the guard gel suffices to protect the indicator for a reasonable interval of time. If desired, filling items 6 to 8 may be identical with items 4 to 2, in which event either end of the tube may be used as inlet. Further, when the non-allochroic gel, items 4 and 6, is not needed, this may be omitted or replaced by the ordinary guard gel, without other change in the arrangement of the tube.

Tubes prepared with corked ends, as in this example, may last several days, but cannot be depended upon as permanent. They should not be used if (1) the blue gel at inlet or outlet has turned lavender or pink, or (2) if the allochroic indicating gel has turned greenish.

Figure 1:
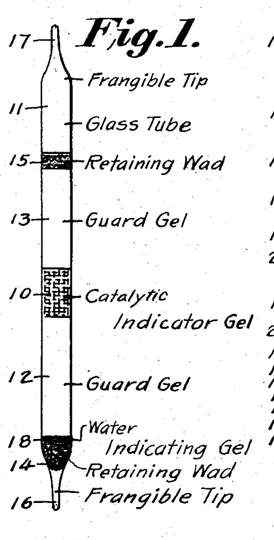
Figs. 1, 2 and 5 are partially diagrammatic elevational views of tubes or ampoules embodying important features of the present invention.

*Example 2.*—Tubes for use after long storage may be made in a somewhat similar manner, but in this instance are sealed off at each end, and made free of any organic material. Such tubes are shown in Figs. 1 to 3.

To prepare the glass envelope, one end of a piece of "Pyrex tubing" about 17 cm. long and 5 mm. inside diameter may be drawn off very sharply to a diameter of not over 2 mm. The length of this constricted segment should be about 10 to 12 mm., and then it should be fused off with a rounded end. The other end of the tube may then be flame polished (to facilitate entry of the retaining wads and eliminate any grease). The tube will then be heated to complete dryness, cooled, and kept in a desiccator pending filling.

The retaining wads in this instance are inorganic, and preferably of woven glass-fibre tape or glass wool, the tape being the more desirable. A piece about 7 mm. long of one inch wide tape about .005 to .007 inch thick makes a suitable wad for a tube of about 5 mm. inside diameter. These glass wads, after treatment with nitric acid when necessary to remove organic matter, and thorough drying (as by heating for one hour to 550° C. in the case of a glass softening at 570° C.), are kept in a desiccator pending use.

In filling, a retaining wad is pushed to the bottom of the tube with a ramrod, and then, aided by suitable dispensing devices, the gel bodies may be quickly added, in measured quantities, which on the average may produce depths of about 2 mm. of the blue water indicating gel, 40 mm. of the heavier activated guard gel, 12 mm. of colorimetric indicator (the non-allochroic yellow gel may also be employed if desired), and then another 20 to 50 mm. of white guard gel (which prevents ingress of moisture during sealing in addition to its other functions). The second glass tape plug is then inserted and pushed down into contact with the gel filling.

According to this invention the tubes are now vibrated, closed end down, for about 3 minutes. This settles the gel firmly and avoids any tendency of the granules to migrate during rough handling and shipment. Following the presettling, the upper wad is tamped down firmly against the gel and the tube is now ready for sealing.

The sealing, in accordance with this invention, is preferably effected in substantial spaced relation (2 cm. for example) from the upper retaining wad in the average tube, the length of the tubular stock, relative to the length of the filling, being fixed with this end in view. This allows ample tolerance for variations in internal diameter of the tubes and allows the tubes to be made of standard length to fit sampling instruments. It also avoids undue heating of the adjacent wad and gel during the sealing off operation and aids in preventing ingress of moisture and other combustion products during the sealing operation. The outlet end of the tube is preferably drawn off somewhat more roundly than the inlet end, care being taken to keep the flame and products of combustion away from the open end of the tube. If needed, as where it is desired to seal the tube off very close to its filling, the main body of the tube may be kept cool during sealing, but as a rule, no special provision is needed if the sealing operation is performed with reasonable rapidity.

VII. Continuous Flow Allochroic Detection

As above mentioned, for continuous flow testing it is desirable, though not essential, to provide a non-allochroic standard color sample, either in the tube as at 20 and 20c (Figs. 2 and 5) or adjacent thereto, so that by an occasional glance the pilot, co-pilot, or other user, may easily note any change of color of the indicator. It is also desirable in continuous flow work, to prolong the life of the tube, to provide a dryer tube, or ampoule to absorb other vapors than that desired to be detected, in advance of the indicator tube (see Fig. 4, for example). Special moisture indicating provisions, as above mentioned in connection with Figs. 2, 3 and 4, are also contemplated, when circumstances warrant.

Where an air suction line is available, as the standard 4-inch suction line used on aircraft to operate the artificial horizon and other instrument, one or more tubes may be received in a permanently installed instrument for holding and individually connecting them to the suction line. For allochroic detecting work such instrument may provide air flow through the dryer tube and continuous sampling tube of as little as 5 ml. per minute, as this will result in detection as quickly as needed to give warning of carbon monoxide before undue concentrations have existed for anything approaching a serious length of time.

With such arrangement, therefore, it is necessary only to inspect the water indicator from time to time for warning of exhaustion of the dryer tube, and any of the procedures above outlined (Part I) may be followed to assure that the indicator 10 and the sample of air reaching it are kept dry. As a rule no change of dryer tubes will be necessary on a flight, as a single tube may last 24 hours or more. As the guard gel 12 in the dryer tube, and that in the inlet to the indicator, will, in carbon monoxide indicators aboard aircraft adsorb all other vapors apt to effect the indicator, it will be apparent at once if the indicator in the continuous-, or open-flow, circuit turns green at any time, that some carbon monoxide is or has been present. The pilot or other crew member of of the plane charged with observing the device will not have to keep the present instrument under continuous observation, but may simply glance at or check it from time to time as a part of the routine instrument check, or oftener if some circumstance dictates this. The change from yellow to green is very marked, and can be seen about as easily as the turning on of a red lamp. (The corresponding change under red light at night is from red to black.) It therefore seems unnecessary to complicate the instrument, as well as add weight and bulk, by arranging a photo-circuit to turn on a red light after the indicator has turned green since the mere act of turning green is easily observed itself. Photo cell circuits can be used for automatically controlling ventilation, however.

VIII. Colorimetric Determination

When it is desired to determine the percentage of a gas as carbon monoxide, in an air sample or the like, as when the open flow tube has indicated presence of the gas, this may be done in several ways.

The simplest procedure is that illustrated in Fig. 6, and as above mentioned (Part I) may involve either a single or fixed number of squeezes of the bulb 22 connected to the de-tipped tube followed by comparison of the resulting color with a color chart or with color comparison tubes, the indicated CO concentration being corrected for altitude by multiplying by a correction factor; or by correlation of the number of squeezes with the altitude according to a predetermined table so that the same color will always indicate the same concentration. By either procedure the complete test and determination can be completed in approximately one minute.

Where more complicated apparatus is provided, as a timer to control flow induced by the 4-inch vacuum line, for example, the tube may simply be de-tipped and inserted in a fixed holder and the timer turned to a position corresponding to the altitude, the timer being of the usual spring driven type and connected to cut off the flow on reaching its stop position.

Under certain circumstances it may be desired to rely on the first few millimeters' length of the indicator gel 10 to perform the function of the dryer gel, and this may be done in spot testing, particularly if the length of the indicator body be increased to, say, twice that herein described. Under such procedure, the first few millimeters of length of the body will be rendered relatively insensitive, and will develop only a pale color, but the adsorptive power of the gel is so high compared with its chemical absorptive power for the gas being determined, that at the rates of flow contemplated by the present invention (1.5 ml. per second through an indicator body 5 mm. in diameter) the sample becomes completely dry without material change in its carbon monoxide content, so that full color development will occur in the subsequent portions of the body. It is thus entirely feasible to supply the present indicator in bulk, protected from moisture or other contamination, and dispense it in measured quantities to a permanently installed apparatus. With such arrangement the setting of the timer can be arranged to dump the previously used indicator body and feed in the new one, concurrent with its other functions. It is preferred, however, to employ standardized tubes provided with guard gel 12, and to provide for automatic feeding of these if desired, to preserve a record of determinations made, for later check. Tubes provided with guard gel 12 and 13 and moisture indicators 18 and 19 spaced considerably from the inlet and outlet, as in Fig. 2, are also desirable, as they can be used under conditions which do not result in response of the indicator, for both continuous and spot checking, repeatedly so long as the indicators show their sensitivity is unimpaired.

IX. VARIOUS USES, MODIFIED AUXILIARIES, ETC.

Broadly, the new allochroic indicator appears to be a silica-molybdate complex catalyzed by palladium in the form of a stable sulfate. Substances which reduce the yellow colored complex produce molybdenum green, blue, or shades of purple, greyish purple, reddish brown, black, etc., depending upon temperature, substance, and degree of reaction. Substances which oxidize the various shades of blue, green, etc., produce the original yellow complex. By taking advantage of the reversible reaction, and also by removing one or more components of a gas mixture or atmosphere to be tested, many qualitative and quantitative tests for many substances or mixtures can be made.

While it is appreciated that the present specification need not point out all the various uses of the present invention, certain of them tend to show the extreme flexibility and sensitivity of the new method and indicator, and are thus worthy of mention.

Most obvious is the fact that the present device, without change, may be used to detect and determine carbon monoxide in gun turrets, gun pits, tanks, and many other locations, as well as in aircraft and industrial processes. Likewise, it is clear that without change, the tube may be employed to detect and determine acetylene, natural gas, and other non-adsorbed reducing gases. In addition, oxidizing gases such as nitrogen dioxide or peroxide in air can be used to reverse the reaction of reducing gases, thus permitting setting of a threshold value upon the sensitivity of the gel to a reducing gas, enabling repeated reuse of the gel by alternate reduction and oxidation, and enabling this latter factor to be employed in automatic apparatus. Hydrogen concentration in air may also be determined, though, strange to say, the new indicator is thousands of times as sensitive to carbon monoxide as it is to hydrogen.

By providing in the tube, or in an auxiliary tube, other reagents, if necessary, to remove interfering substances in greater or less proportion than would be effected by the guard gel, other uses can be realized. For determining gasoline vapors in air, for example, the indicating gel 10 may be used with an inert dessicant which is not a strong adsorbent, such as "Drierite" (an activated calcium sulfate) in lieu of the guard gel 12, and with water sensitized "Drierite" in lieu of the water indicator 18, a charge of a carbon monoxide remover such as "Hopcalite" (a copper-oxide-manganese oxide absorbent) being employed, if necessary or desired. With a similar arrangement the device will detect and determine other organic vapors such as ether, ethylene, other anesthetics, vapors of commercial organic solvents and other unsaturated organic compounds and vapors and gases which reduce the yellow silico molybdate complex or oxidize the green or blue complexes.

Also, if desired when detecting a particular gas, as carbon monoxide, two tubes may be employed, one preceded by a charge of absorbent for the particular gas, as "Hopcalite," to remove carbon monoxide, to establish its identity in the second tube used in the parallel test; the absorbent being either included in the inlet end of a lengthened tube, or carried in a separate tube as exemplified in Fig. 4.

For determining oxidizing gases and vapors, the tube, for example, may contain (a) indicating gel which has been reduced by a definite amount, as by exposure to a known concentration of carbon monoxide, and which will then change from blue to green to yellow upon reaction with oxidizing gases, (b) guard gel or "Drierite," depending upon the substance to be determined, (c) water indicating gel or "Drierite," (d) in special cases other reagents, in the tube or an auxiliary purifier, to remove interferants. In this manner, the halogens, oxides of nitrogen, ozone, etc. can be determined.

Due to its extreme sensitivity the new indicator can be employed to determine the degree of saturation of the blood with respect to carbon monoxide by analyzing alveolar air, which is reported to be in continuous and practically instantaneous equilibrium with arterial blood. For this purpose the patient respires normally, then expels alveolar air to flush the respiratory passages, closes the nose, and expels into a syringe the last portion of alveolar air he can conveniently eject. By arranging the syringe and a restricted passage rubber bulb at opposite ends of the indicator tube, and passing the alveolar air through the indicator colorimetric indication of the percentage of CO may be obtained. For high concentrations smaller samples of alveolar air may be diluted with pure air, the content of the original being calculated from the determined content of the diluted sample. Then from the equilibrium relation between alveolar air and blood saturation, the blood saturation is easily determined.

The use of glass tape wads is particularly advantageous procedurally. Glass wool is difficult to handle, and presents personnel problems. Metal is difficult to handle and may shed oxide particles which will cause trouble if they filter through to the acid indicator gel. The glass tape is more readily inserted than either of the others, and eliminates these problems.

The isolation of the cobaltous chloride sensitized water indicator gel or "Drierite" may be effected by such wads, as well as by the chloride-free guarding material.

It will further be apparent to those skilled in the art that while the substances disclosed herein are preferred and yield the best and most sensitive indicator, indicators can be made using other metals of the platinum group in lieu of palladium, other metals of the chromium group in lieu of molybdenum, etc. without departing from the broader aspects of the invention. In short, from the foregoing description of preferred embodiments of the several features of the invention it will be apparent that the invention is not limited to the forms described.

What is claimed is:

1. The method of preparing a highly stable catalytic solution of palladium which consists in digesting partially oxidized palladium by refluxing at about 300° C. in concentrated sulfuric acid in the proportions of about 175 ml. of the acid to 15 grams of the digestant until a dark brown shiny precipitate is formed, continuing heating while slowly adding water until the precipitate is dissolved, with intervening refluxing at the boiling temperature when evolution of sulfur-dioxide appears, and until the boiling temperature becomes about 200° C., cooling, filtering and diluting the solution with water and sulfuric acid to contain approximately 9.5 to 13 grams of palladium and 300 to 370 grams of sulfuric acid per unit volume of at least one liter thereof, whereby there is obtained a solution containing the palladium in such form that it does not develop any substantial amount of precipitate even on long standing, which solution is capable of forming with ammonium molybdate and purified silica gel a highly sensitive long-lived colorimetric indicator useful in detecting carbon-monoxide and other reducing and oxidizing gases.

2. A catalytic solution of palladium sulfate and sulfuric acid containing from about 9.5 to 13 grams of palladium and from about 300 to 370 grams of sulfuric acid per unit volume of at least one liter thereof, which does not develop any substantial amount of precipitate on standing for long periods of time, and which is capable of forming with ammonium molybdate and purified silica gel a highly sensitive long-lived colorimetric indicator useful in detecting carbon monoxide and other reducing and oxidizing gases.

3. An indicating composition adapted for gas analysis which consists essentially of a body of purified silica gel which has been freed of substances oxidizable by hot concentrated nitric acid, said purified gel having combined therein the essentially dry residues of impregnation with a solution of palladium sulfate, sulfuric acid and ammonium molybdate, in the proportions by weight of about 500 to 1600 parts gel, 5 to 50 parts acid containing about 1 part palladium, and about 10 to 60 parts molybdate, said composition being critically free of halide ion and having a clear yellow color which changes through shades of green toward blue on exposure to carbon monoxide.

4. An indicating composition according to claim 3 in which the constituents are present in the proportions of about 770 parts purified gel, 25 parts acid containing about 1 part palladium, and about 17 parts molybdate.

5. A process of detecting carbon monoxide which consists essentially in passing an air sample over a solid phase dessicating material and then over an indicating material having the composition of claim 3, whereby a color change is effected in said composition proportional to the carbon monoxide content of said sample.

6. A process of detecting carbon monoxide which consists essentially in passing an air sample over highly dried purified silica gel and then over the composition of claim 3, whereby said sample is cleaned of organic vapors and other interfering gases and a color change is effected in said composition proportional to the carbon monoxide content of the cleaned dried sample.

7. A gas detector comprising a sealed glass tube adapted to be opened at its ends for the passage of gas therethrough, an indicating body therein of the composition defined in claim 3, said body being interposed between guarding bodies of dried purified silica gel free of all substances oxidizable by hot nitric acid.

8. A gas detector according to claim 7, said indicating body and guard bodies being in said tube between end plugs of purified sintered glass fibre fabric.

GEORGE MARTIN SHEPHERD.

REFERENCES CITED

The following references are of record in the file of this patent:

UNITED STATES PATENTS

| Number | Name | Date |
|---|---|---|
| 1,321,062 | Lamb et al. | Nov. 4, 1919 |
| 1,489,247 | Hill | Apr. 8, 1924 |
| 1,644,014 | Gordon et al. | Oct. 4, 1927 |
| 1,671,517 | Edeleanu | May 29, 1928 |
| 1,675,308 | Jaeger | June 26, 1928 |
| 2,111,301 | Schroter | Mar. 15, 1938 |
| 2,174,349 | Littlefield | Sept. 26, 1939 |

FOREIGN PATENTS

| Number | Country | Date |
|---|---|---|
| 345,672 | Great Britain | 1930 |

OTHER REFERENCES

Mellor: "Comprehensive Treatise on Inorganic and Theoretical Chemistry," vol. 15, page 683. Longmans, Green and Co., N. Y. C. (1936).

Baker and Co., Inc., Newark, New Jersey. "Bibliography of Patents on Palladium as a Catalyst," Part I, pp. 5, 14, 16, and 24 (1939).